May 25, 1943. E. C. PITZER 2,319,948
CATALYTIC PROCESS OF TREATING HYDROCARBONS
Filed July 5, 1940
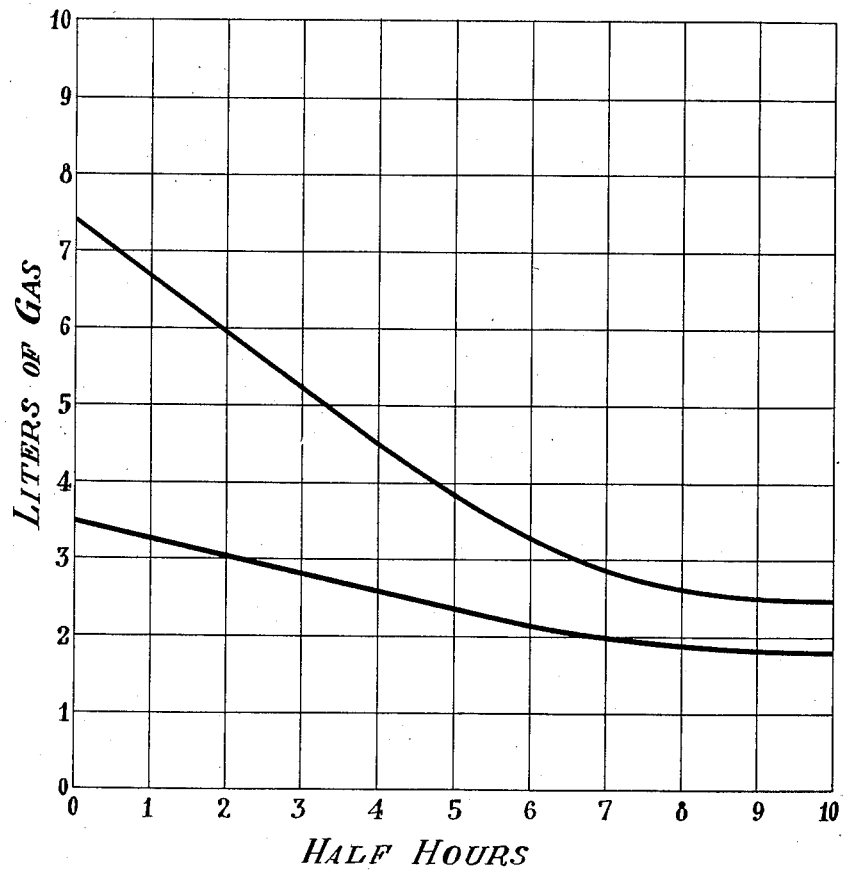
Inventor:
Edgar C. Pitzer
By Vanderveer Voorhees
Attorney Patented May 25, 1943

2,319,948

UNITED STATES PATENT OFFICE 2,319,948

CATALYTIC PROCESS OF TREATING HYDROCARBONS

Edgar C. Pitzer, Chicago, Ill., assignor to Standard Oil Company, Chicago, Ill., a corporation of Indiana Application July 5, 1940, Serial No. 343,911

5 Claims. (Cl. 196—52)

This invention relates to the conversion of hydrocarbon oils at elevated temperatures and in the presence of selected catalysts comprising compounds of aluminum supported on an oxide of titanium. More specifically, the invention relates to a method and catalyst for the reforming of petroleum naphthas of low knock rating to produce gasoline of high knock rating by contacting with such a catalyst. The catalyst may also be used for cracking of heavier oils and for the dehydrogenation of hydrocarbons generally.

Many catalysts have been tried for the conversion or reforming of low knock rating naphtha into gasoline of high knock rating and many problems are encountered in this type of process. Some catalysts which have satisfactory catalytic activity can not be used commercially because they deteriorate rapidly, becoming ineffective after a relatively few regenerations. Other catalysts require too frequent regenerations to be economical. Still other catalysts produce an excessive amount of carbon deposit in relation to the gas and gasoline production, whereas others produce an excessive gas loss. The object of my invention is to provide a more suitable catalyst for this purpose.

I have discovered that oxygen-containing compounds of aluminum including aluminum oxide and hydroxide supported on titanium oxide and more particularly titania gel produce very satisfactory catalysts for this reaction. These catalysts may be prepared in various ways but in general I prefer to employ the method of co-precipitation from the salts of the metals in solution. Thus, I may mix solutions of aluminum sulfate and titanium sulfate in the proper proportion and then add ammonium hydroxide or other base to bring about coagulation. The precipitate of hydrated oxides may be washed with water and dried; then heated at about 900° F. for 2 hours to effect activation. The product which is hard and granular may be graded to particles convenient for use.

Instead of co-precipitating the aluminum oxide or other aluminum compound with titania, other methods may be used to prepare my catalyst such as impregnating titania or titania gel with an aluminum salt, grinding titania and alumina together in a ball mill followed by pelleting the mix, etc. In the latter case the finely pulverized mixture is preferably wet with water before pelleting.

Titanium sulfate used in the preparation of my catalyst may be made by dissolving $TiO_2$ in hot sulfuric acid. I prefer to regulate the proportions of the reagents to produce a catalyst having at least 50% of titanium oxide and generally I prefer to employ about 75 to 85% of titanium oxide. Good results have been obtained with a catalyst containing about 10% alumina and 90% titanium oxide. I also prefer to use precipitated $TiO_2$ or metatitanic acid because of its greater ease of solution in acid.

In preparing the catalyst I may regulate the hydrogen ion concentration so that a gel is obtained. For example titania gel may be prepared by regulating the hydrogen ion concentration between about 0.1 to 0.5 mol per liter. After washing the gel to remove salts its may be treated with a soluble aluminum salt $Al(NO_3)_3$, for example, then dried slowly at temperatures below 212° F. and activated by heating gradually, preferably to about 900 to 1200° F. for from about one half hour to 5 hours before use as a hydrocarbon conversion catalyst. After the catalyst has been employed for a period of time, generally a matter of hours, its catalytic activity is largely lost but it can be restored by subjecting it to regeneration in the presence of oxygen or an oxygen-containing gas such as air. The temperature of the regeneration step is controlled by regulating the rate of introduction and the oxygen concentration of the gas, preferably keeping the temperature below about 1100° F.

The following examples illustrate the conversion of a hydrocarbon naphtha known as mineral spirits by treating with a catalyst consisting of aluminum oxide on titania in the proportion of about 1 mol of aluminum oxide to 6 mols of titania. Run No. 1 was made with freshly prepared catalyst and Run No. 2 with the same catalyst after revivification by burning.

| Run No. | 1 | 2 |
|---|---|---|
| Catalyst | $Al_2O_3$:6$TiO_2$ | (¹) |
| Temp. ° F | 900 | 1000 |
| Length of run in hours | 5.0 | 5.0 |
| Total gas, liters | 20,700 | 47,340 |
| Mol. wt. of gas | 5.08 | 7.12 |
| Liters gas/100 cc. feed (1st ½ hr.) | 11.88 | 29.90 |
| (10th ½ hr.) | 7.03 | 13.18 |
| Vol. percent liquid yield | 88.70 | 77.50 |
| Wt. percent liquid yield | 93.40 | 79.50 |
| Wt. percent gas | 2.26 | 7.24 |
| Wt. percent carbon deposit on catalyst | 1.891 | 3.32 |
| Wt. balance | 97.6185 | 90.0738 |
| Octane no. increase | 17.0 | 32.0 |

¹ Same catalyst revivified.

In the foregoing examples the catalyst was prepared by treating 6 mols of titanium sulfate with amalgamated aluminum according to the following equation:

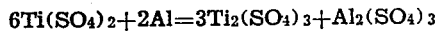

The solution was neutralized with ammonia and the precipitate of mixed hydroxides was washed on a filter, dried, and ignited at 900° F. The residue was essentially $Al_2O_3 + 6TiO_2$. Slight deviations from this molar ratio may arise from incomplete reduction of $Ti^{++++}$ or from solution of excess Al.

One of the characteristics of the above catalyst is its sustained activity as indicated by gas evolution. The graph which accompanies this specification and forms a part hereof illustrates this characteristic of the activated titania catalyst. The graph shows the rate of gas evolution from mineral spirits at 2 temperatures, 900 and 975° F., the upper line corresponding to the higher temperature. The catalyst used for these determinations consisted approximately of 1 mol of alumina on 5 mols of titania prepared by a co-precipitation from the sulfates with ammonium hydroxide.

For the preparation of my catalyst I may conveniently employ the acid cake or sludge which is an intermediate in the preparation of titania pigment from ilmenite.

In preparing this material the finely powdered ilmenite is dissolved in hot sulfuric acid and the solution is cooled and diluted with cold water. Ferric iron salts are reduced to ferrous salts by adding a reducing agent such as metallic iron, metalic zinc, etc., then the dilute solution is boiled for a period of 4 to 6 hours whereupon titanium contained therein is precipitated in the form of meta titanic acid. This material is separated from the solution and forms the acid cake or sludge above referred to. It may be washed free from adhering solution.

In employing this material I may first dry it at a temperature preferably below 600° F. After cooling, it may be treated with an aluminum salt as in the following example: 100 grams of finely powdered titania prepared as above was dissolved in a hot solution of 140 cc. $H_2SO_4$ and 140 cc. water. The solution was added to 3 liters of water containing 132 grams of $Al_2(SO_4)_3 \cdot 18H_2O$. A slight excess of ammonia sufficient to show alkaline with methyl red was added at room temperature with vigorous stirring. The sludge was allowed to settle out, washed with water on a vacuum filter and slowly heated to 900° F. to expel ammonium salts. The product was pressed into pellets. When employed for the reforming of mineral spirits at 1000° F. and space velocity of 1 volume of oil per volume of catalyst per hour the octane number of the mineral spirits increased from 30 to 56.5.

In general my catalyst will contain from about 5 to 50% of alumina, preferably about 10 to 40%.

Reforming of naphthas may be carried out at atmospheric pressure but I prefer to employ higher pressures of the order of 50 to 500 pounds per square inch. Space velocities within the range of 0.1 to 10 volumes of feed per volume of catalyst per hour may be used, preferably a space velocity of about 0.2 to 3. Temperatures within the range of 850 to 1050° F. may be used and I may employ hydrogen to increase the life of the catalyst and effect aromatization of the naphtha. For this purpose hydrogen pressures of the order of 50 to 400 pounds may be used. I may also employ hydrogen in the cracking of gas oils in order to increase the life of the catalyst.

In a modification of my invention I may employ small amounts of promoters selected from the class consisting of chromium, molybdenum, tungsten, and vanadium as additions to my alumina-titania catalyst. The amounts of these promoters will usually be less than 5% and generally less than 1%, for example, 0.1 to 0.5%. The effect of the promoters is to decrease the deposition of carbon on the catalyst and increase the octane number of the gasoline product.

Having thus described my invention what I claim is:

1. The process of converting hydrocarbon oils into gasoline of high knock rating which comprises contacting the vapors of said oils at conversion temperatures with a catalyst consisting essentially of a major proportion of titanium oxide in the form of a gel in combination with about 10 to 40% of aluminum oxide.

2. The process of reforming low knock rating naphtha by passing vapors thereof at a temperature of about 900 to 1050° F. in contact with a catalyst consisting essentially of a major proportion of titanium oxide in the form of a gel and about 10 to 40% of aluminum oxide.

3. The process of claim 2 wherein hydrogen is added to said naphtha vapors in contact with said catalyst.

4. The process of claim 1 wherein the catalyst is promoted by an addition thereto of a small amount of an oxide of a metal selected from the class consisting of chromium, molybdenum, tungsten and vanadium.

5. The process of converting hydrocarbon oils into gasoline of high knock rating which comprises contacting the vapors of said oils at conversion temperature with a titania-alumina catalyst containing from 10 to 40% of alumina prepared by treating a solution of a titanic salt with aluminum amalgam, thereby reducing said titanic salt to a titanous salt and dissolving aluminum in said solution, then co-precipitating hydroxides of aluminum and titanium with ammonia and drying and igniting said precipitate.

EDGAR C. PITZER.